United States Patent
Cho et al.

(10) Patent No.: US 6,345,020 B1
(45) Date of Patent: Feb. 5, 2002

(54) APPARATUS AND METHOD FOR GENERATING A TRACKING ERROR SIGNAL USING FIRST THROUGH FOURTH OPTICAL DETECTOR ELEMENTS

(75) Inventors: Gea-ok Cho; Chun-sup Kim, both of Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/260,020

(22) Filed: Mar. 2, 1999

(30) Foreign Application Priority Data

Jun. 25, 1998 (KR) .............................. 98-24154

(51) Int. Cl.$^7$ ................................ G11B 7/00
(52) U.S. Cl. .................. 369/44.32; 369/44.41
(58) Field of Search ............. 369/44.32, 44.35, 369/44.41

(56) References Cited

U.S. PATENT DOCUMENTS

| | | | | |
|---|---|---|---|---|
| 4,924,455 A | * | 5/1990 | Fujiie et al. | 369/44.21 |
| 5,703,848 A | * | 12/1997 | Hofer | 369/44.35 |
| 5,812,503 A | * | 9/1998 | Minami et al. | 369/44.35 |
| 5,909,416 A | * | 6/1999 | Matsui | 369/44.41 |
| 5,926,445 A | * | 7/1999 | Sasaki et al. | 369/44.35 |
| 5,956,304 A | * | 9/1999 | Supino et al. | 369/44.41 |
| 5,986,999 A | * | 11/1999 | Takahashi | 369/44.41 |
| 5,991,248 A | * | 11/1999 | Hong | 369/44.35 |
| 6,031,799 A | * | 2/2000 | Hwang | 369/44.41 |

* cited by examiner

Primary Examiner—Aristotelis M. Psitos
(74) Attorney, Agent, or Firm—Staas & Halsey LLP

(57) ABSTRACT

An apparatus and method for adaptively generating a tracking error signal according to a phase error generated due to a nonuniform depth of pits formed in an optical disk. The apparatus includes a first adder to output a first added signal (A+C) among optical detection signals A, B, C and D output by four elements for detecting light beams reflected from the optical disk, a second adder to output a second added signal (B+D) among the optical detection signals A, B, C and D, a multiplexer to receive the optical detection signals A, B, C and D, the first added signal (A+C), and the second added signal (B+D), and to select and output the signals (A+C) and (B+D), A and B, or C and D, a phase detector to determine a difference between the two signals output by the multiplexer, and output the difference as a tracking error signal and determine whether the tracking error signal is normal, and a selection controller to control selection of the multiplexer according to the result of the determination of the phase detector. Therefore, an optimal tracking error signal is obtained by selecting appropriate optical detection signals according to the phase error between the selected optical detection signals.

22 Claims, 4 Drawing Sheets

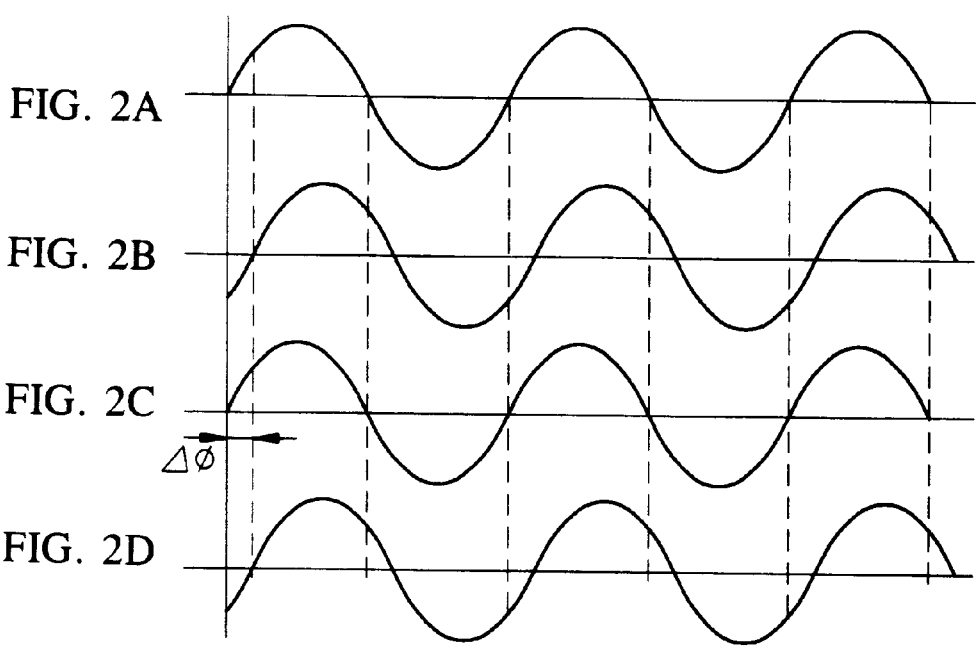
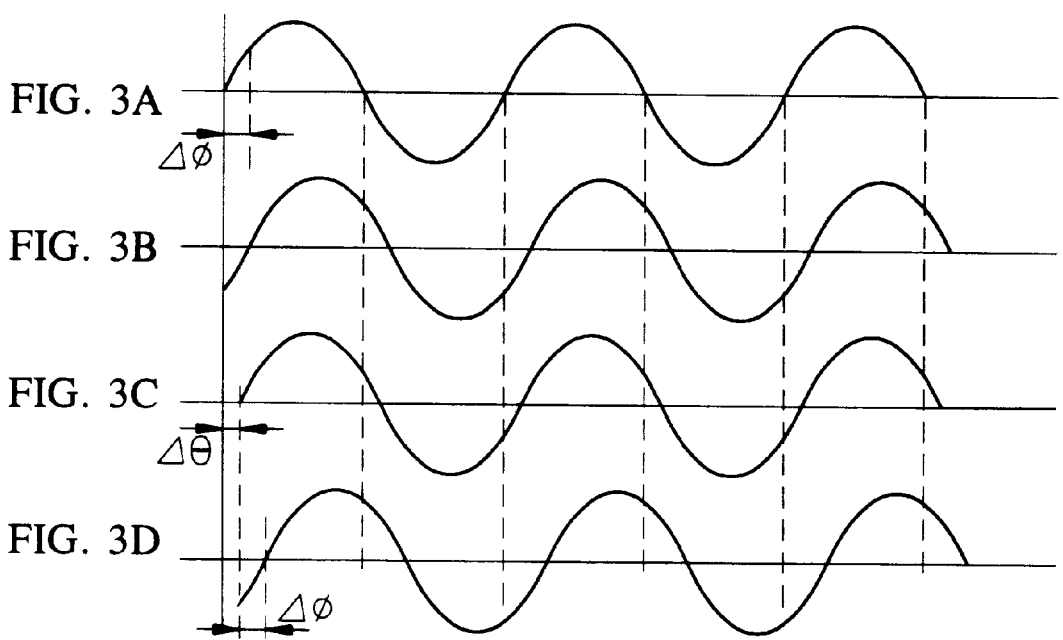

APPARATUS AND METHOD FOR GENERATING A TRACKING ERROR SIGNAL USING FIRST THROUGH FOURTH OPTICAL DETECTOR ELEMENTS

CROSS-REFERENCE TO RELATED APPLICATIONS

This application claims the benefit of Korean Application No. 98-24154, filed Jun. 25, 1998, in the Korean Patent Office, the disclosure of which is incorporated herein by reference.

BACKGROUND OF THE INVENTION

1. Field of the Invention

The present invention relates to an apparatus and method for generating a tracking error signal, and more particularly, to an apparatus and method for adaptively generating a tracking error signal according to a phase error generated due to an irregular pit depth of a disk.

2. Description of the Related Art

A tracking servo of an optical disk is usually controlled by a differential phase detection (DPD) method of detecting a phase difference using a four-element optical detector.

FIG. 1 shows a tracking error signal extraction system using the DPD method. As shown in FIG. 1, an optical detector 10 includes four elements A, B, C and D which detect light beams reflected by an optical disk. Among optical detection signals output by the four elements A, B, C and D, the outputs of two elements diagonally located in a track direction are synthesized and applied to a differential amplifier 15. That is, when diagonal synthesized signals are A+D and B+C, the synthesized signal A+D is input to a (+) port of the differential amplifier 15, and the synthesized signal B+C is input to a (−) port thereof. Thus, an output signal of the differential amplifier 15 is (A+D)−(B+C).

FIGS. 2A through 2D illustrate phase relationships between optical detection signals obtained from the elements A through D, respectively, when an optical disk having a uniform pit depth is scanned in a radial direction.

Generally, the optical detection signals output by the elements A and C have the same phase, and likewise for signals output by the elements B and D, whereas the optical detection signals output by the elements A and B and those output by the elements C and D each pair have a difference in phase of $\Delta\phi$. Therefore, first and second diagonal synthesized signals (A+D) and (B+C) each include the common phase difference ($\Delta\phi$). Also, when the second diagonal synthesized signal (B+C) is subtracted from the first diagonal synthesized signal (A+D), the common phase difference ($\Delta\phi$) is deleted. Thus, the phase difference hardly affects a tracking error.

FIGS. 3A through 3C illustrate phase relationships between optical detection signals obtained from the elements A through D, respectively, when an optical disk having a nonuniform pit depth is scanned in a radial direction.

In the case of the optical disk having a nonuniform pit depth, each pair of the optical detection signals output by the elements A and B and the elements C and D has a phase difference of $\Delta\phi$, and further has a group phase difference of $\Delta\theta$ depending on a pit depth.

The first and second diagonal synthesized signals (A+D) and (B+C) each have different phase errors of $\Delta\phi$ and $\Delta\phi+\Delta\theta$, so that distortion is generated. Thus, a normal tracking error signal is not obtained.

FIG. 4 is a block diagram showing a configuration of another conventional apparatus for generating a tracking error signal. The apparatus of FIG. 4 includes first through fourth delays 40, 42, 44, and 46, first and second adders 48 and 50, equalizers 52 and 54, and a phase detector 56.

The first through fourth delays 40, 42, 44 and 46 compensate for an optical signal detected by a four-element optical detector, each using a different delay amount.

The first adder 48 adds optical signals A and D respectively from the first and third delays 40 and 44 and outputs a first diagonal added signal (A+D). The second adder 50 adds optical signals B and C respectively from the second and fourth delays 42 and 46 and outputs a second diagonal added signal (B+C).

The equalizers 52 and 54 equalize the first and second diagonal added signals (A+D) and (B+C) from the first and second adders 48 and 50, respectively. The phase detector 56 determines a difference between the output signals of the equalizers 52 and 54 and outputs a tracking error signal ((A+D)−(13+C)).

Here, the first through fourth delays 40, 42, 44, and 46 delay the optical signals A, B, C and D output by the four-element optical detector, to prevent them from having a phase difference. The delay amount of each of the delays 40, 42, 44 and 46 uses a value measured by a system upon initial driving of an optical disk. That is, the system first detects the phase differences between the optical detection signals A, B, C and D of the four-element optical detector, and regulates the delay amount of each of the delays 40, 42, 44 and 46 to minimize the phase differences between the optical detection signals A, B, C and D, thereby driving loaded optical disks.

However, the conventional apparatus for generating a tracking error signal as shown in FIG. 4 requires a complicated algorithm for regulating the delay amounts of the delays 40, 42, 44 and 46, thus increasing a load to the system and power consumption.

SUMMARY OF THE INVENTION

To solve the above problems, it is an object of the present invention to provide an apparatus for adaptively generating a tracking error signal according to a phase error caused by a pit depth.

Additional objects and advantages of the invention will be set forth in part in the description which follows and, in part, will be obvious from the description, or may be learned by practice of the invention.

Accordingly, to achieve the above and other objects of the present invention, there is provided an apparatus for generating a tracking error signal, including a first adder to output a first added signal (A+C) among optical detection signals A, B, C and D output by four respective elements for detecting light beams reflected by an optical disk; a second adder to output a second added signal (B+D) among the optical detection signals A, B, C and D; a multiplexer to receive the optical detection signals A, B, C and D, the first added signal (A+C), and the second added signal (B+D), and to select and output the signals (A+C) and (B+D), A and B, or C and D; a phase detector to determine a difference of the signals output by the multiplexer and output the difference as a tracking error signal and determine whether the tracking error signal is normal; and a selection controller to control selection of the multiplexer according to the result of the determination of the phase detector.

BRIEF DESCRIPTION OF THE DRAWINGS

The above and other objects and advantages of the present invention will become more apparent by describing in detail a preferred embodiment thereof with reference to the attached drawings in which:

FIG. 2 illustrates phase relationships between optical detection signals obtained when an optical disk having a uniform pit depth is scanned in a radial direction thereof;

FIG. 3 illustrates phase relationships between optical detection signals obtained when an optical disk having a nonuniform pit depth is scanned in a radial direction thereof;

DESCRIPTION OF THE PREFERRED EMBODIMENT

Figure 1:
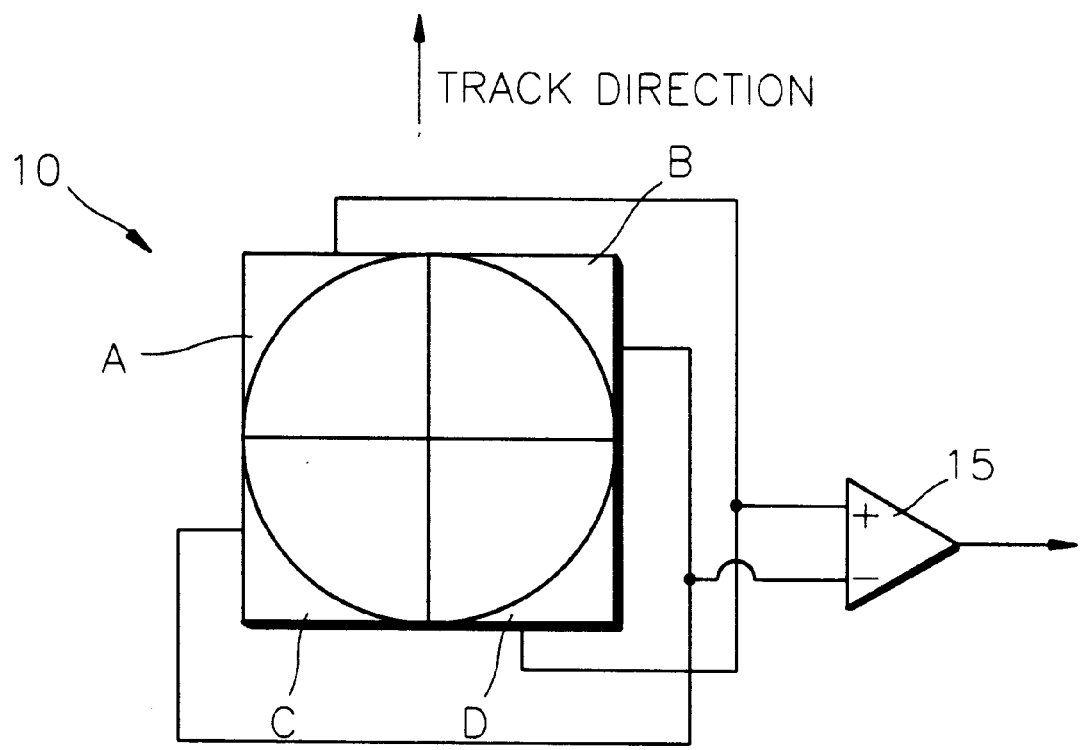
FIG. 1 shows a configuration of a conventional apparatus for generating a tracking error signal.
Figure 4:
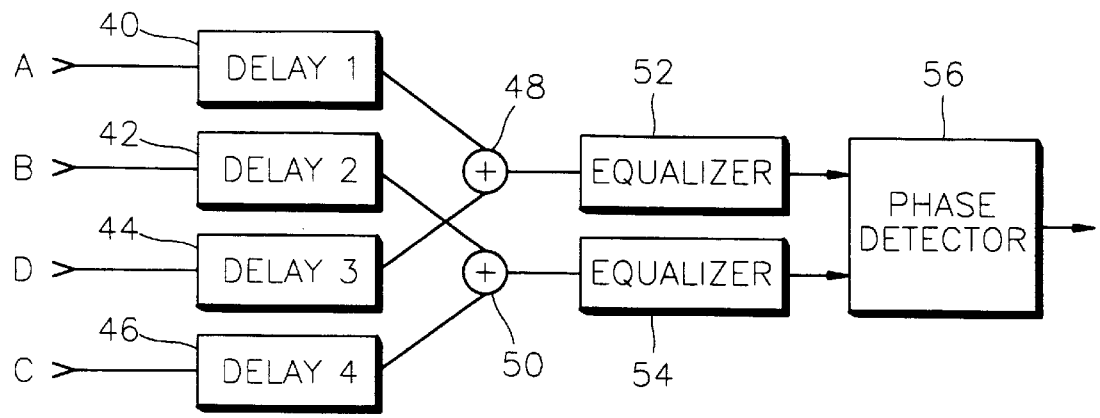
FIG. 4 is a block diagram of another conventional apparatus for generating a tracking error signal.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

In a disk having pits of nonuniform (varying) depth, a group phase difference of $\Delta\theta$ exists between signals A and B and between signals C and D, as shown in FIG. 3. Accordingly, a tracking error due to the signals A and B or the signals C and D must be detected. That is, when a tracking error signal is generated by a method of (A+D)−(B+C), distortion is generated by a phase difference. Thus, the present invention proposes a method of detecting the tracking error using the signals A and B, the signals C and D, or first and second synthesized signals (A+C) and (B+D).

Figure 5:
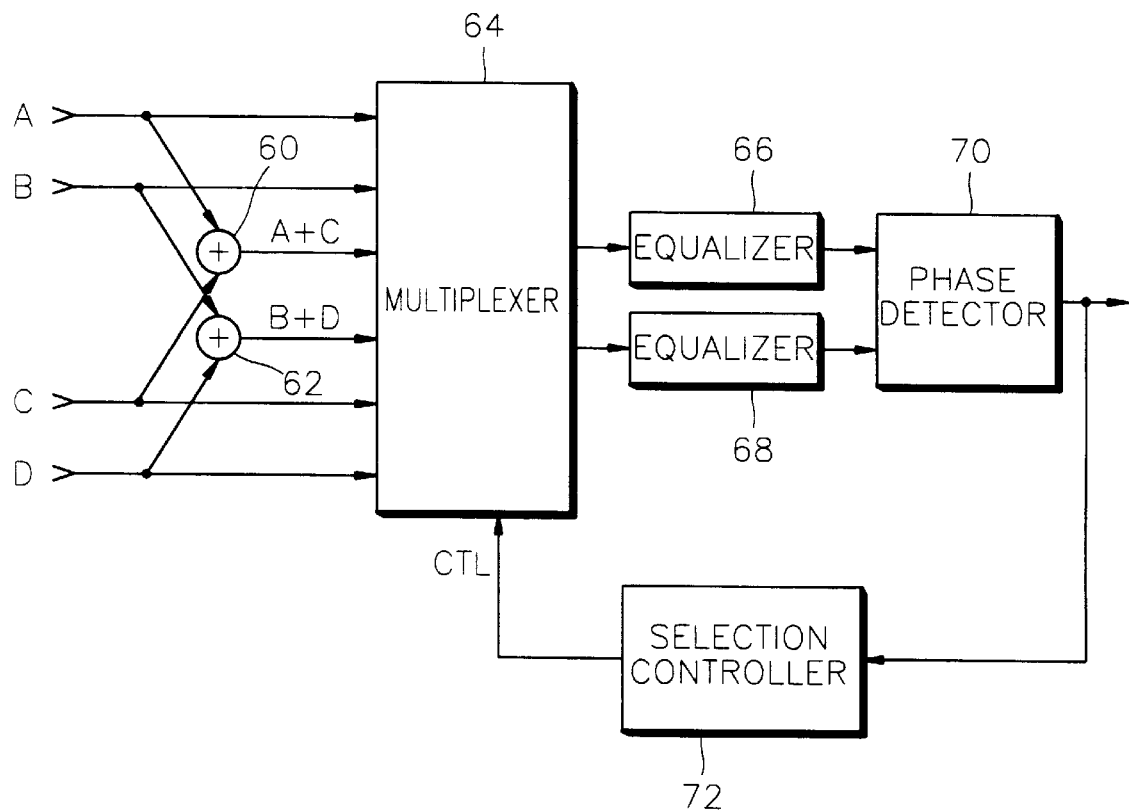
FIG. 5 is a block diagram of an apparatus for generating a tracking error signal, according to an embodiment of the present invention.

Referring to FIG. 5, an apparatus for generating a tracking error signal, according to an embodiment of the present invention, includes adders 60 and 62, a multiplexer 64, equalizers 66 and 68, a phase detector 70, and a selection controller 72.

The first adder 60 generates a first added signal (A+C) obtained by summing two signals A and C detected by a four-element optical detector (not shown, but like that shown in FIG. 1). The second adder 62 generates a second added signal (B+D) obtained by summing two signals B and D detected by the four-element optical detector (not shown, but like that shown in FIG. 1).

The multiplexer 64 receives the signals A, B, C and D detected by the four-element optical detector (not shown, but like that shown in FIG. 1) and the first and second added signals (A+C) and (B+D) respectively applied by the adders 60 and 62. The multiplexer 64 selects one group among the signals A and B, the signals C and D, and the added signals ((A+C) and (B+D) in response to an applied selection signal CTL from the selection controller 72.

The first equalizer 66 equalizes and outputs a first output signal A, C or (A+C) of the multiplexer 64. The second equalizer 68 equalizes and outputs a second output signal B, D or (B+D) of the multiplexer 64.

The phase detector 70 determines a difference between the output signals of the equalizers 66 and 68 and outputs the difference signal as a tracking error signal, and determines whether the tracking error signal is suitable or not.

The phase detector 70 can be realized as an apparatus for detecting a phase difference using a phase difference between zero-crossing points of the output signals of the equalizers 66 and 68. That is, in the output signals of the equalizers 66 and 68, when the phase difference between the zero-crossing points from negative (−) to positive (+) or from positive (+) to negative (−) deviates from a predetermined range, it is determined that an unsuitable tracking error signal is generated.

Also, the phase detector 70 obtains a tracking error signal using the sum signal of the output signals of the equalizers 66 and 68, and can be realized as an apparatus for determining whether a normal tracking error signal is generated, by tracing the tracking error signal. A typical tracking error signal is a sinusoidal wave which varies within a range between predetermined peak-to-peak values as an optical pickup moves a track in a radial direction. If this sinusoidal wave deviates from the range between the predetermined peak-to-peak values, it can be estimated that a normal tracking error signal is not generated.

Here, whether the tracking error signal fluctuates according to a normal sinusoidal waveform can be determined by setting a window. That is, if the tracking error signal fluctuates according to the normal sinusoidal waveform when positive and negative threshold values have been set, a pattern in which the tracking error signal rises over the positive threshold value, again drops below the positive threshold value, drops below the negative threshold value, and again rises over the negative threshold value is repeated at regular periods. Otherwise, it can be determined that the tracking error signal is abnormal.

The selection controller 72 sequentially selects the signals (A+C) and (B+D), the signals A and B, or the signals C and D, when the phase detector 70 detects that the phase error deviates from the predetermined range. The selection controller 72 selects the signals (A+C) and (B+D) as default values. If the phase error deviates from a given range at a moment, that is, if the phase difference between the output signals of the first and second equalizers 66 and 68 deviates from the predetermined range, then the selection controller 72 changes the selection signal CTL to allow the multiplexer 64 to output the signals A and B. As a result, the multiplexer 64 outputs the signals A and B instead of the signals (A+C) and (B+D). If the phase difference between the signals A and B also deviates from the given range, the selection controller 72 changes the selection signal CTL to allow the multiplexer 64 to output the signals C and D. According to such an operation, a tracking error signal can be generated from optical detection signals having the least phase error according to the state of an optical disk from which information is read.

When the phase detector 70 is realized as an apparatus for determining whether a normal tracking error signal is generated, the selection controller 72 controls selection according to a determination signal supplied by the phase detector 70.

Figure 6:
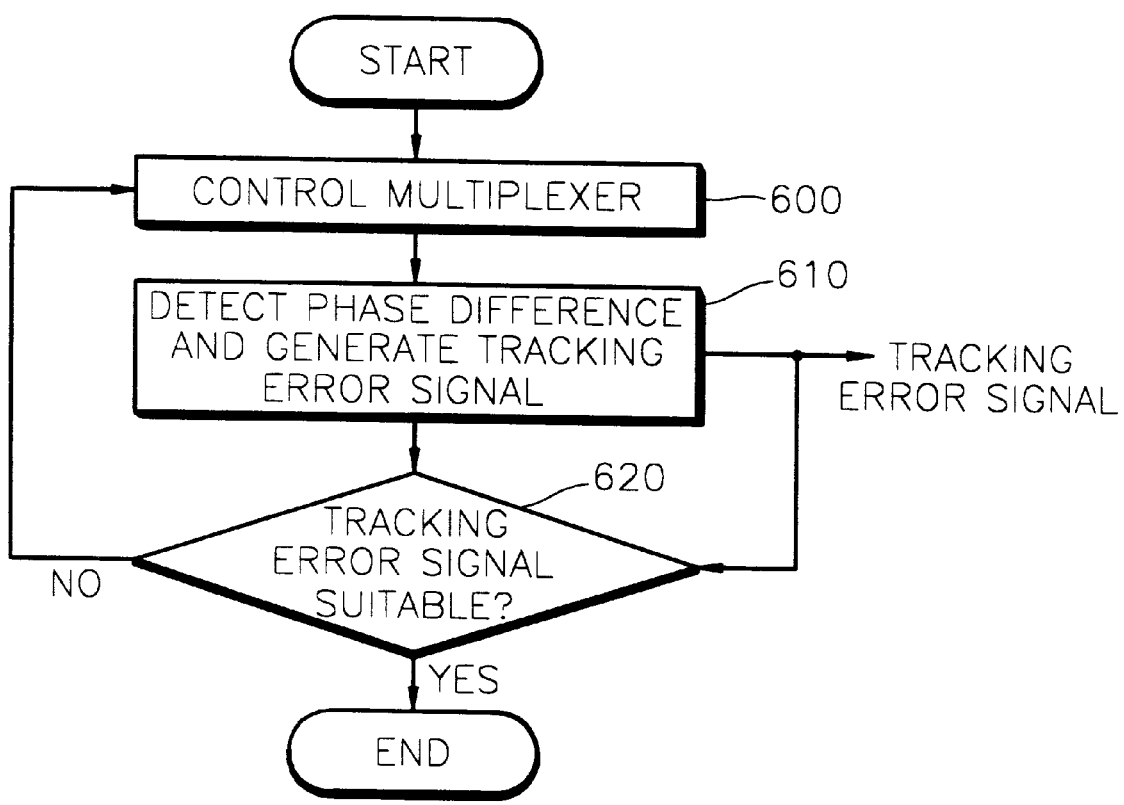
FIG. 6 is a flowchart illustrating a process for controlling the apparatus shown in FIG. 5.

FIG. 6 is a flowchart illustrating a method of driving the apparatus shown in FIG. 5. The steps shown in FIG. 6 are performed to control generation of a tracking error signal when loaded optical disks are initially driven.

The method shown in FIG. 6 includes a multiplexer control step 600, and a phase error detection and tracking error signal generation step 610, and a tracking error signal suitability determination step 620. In step 600, the multiplexer 64 is controlled to select the signals (A+C) and (B+D), A and B, or C and D. For example, the signals (A+C) and (B+D) are set as default values in this step. The equalizers 66 and 68 equalize the respective selected signals from the multiplexer 64.

In step 610, a phase difference between the equalized output signals from the equalizers 66 and 68 is detected, and a tracking error signal is generated by the phase detector 70 in step 600.

In step 620, it is determined whether the tracking error signal generated in step 610 is suitable or not. If the tracking error signal is suitable (appropriate), the signals selected in step 600 are used without change.

Otherwise, a procedure returns to the step 600, and the multiplexer 64 is controlled to select the signals A and B or C and D.

In the tracking error signal generation apparatus according to the present invention as described above, an optical tracking error signal is obtained by selecting appropriate optical detection signals according to the phase error between optical detection signals.

What is claimed is:

1. An apparatus for generating a tracking error signal using first through fourth elements A, B, C, D, respectively, of an optical detector which detects light beams reflected from an optical disk, comprising:
    a first adder to generate a first added signal (A+C) by adding first and third optical detection signals A and C output by the first and third elements, respectively;
    a second adder to generate a second added signal (B+D) by adding second and fourth optical detection signals B and D output by the second and fourth elements, respectively;
    a multiplexer to receive the optical detection signals A, B, C and D, the first added signal (A+C), and the second added signal (B+D), and to select and output a first group of the first and second added signals (A+C) and (B+D), a second group of the optical detection signals A and B, or a third group of the optical detection signals C and D;
    a phase detector to determine a difference between the signals of the first, second or third group output by the multiplexer, and output the difference as a tracking error signal and determine whether the tracking error signal is normal; and
    a selection controller to control selection of the first, second or third group by the multiplexer according to the determination of the normality of the tracking error signal by the phase detector.

2. The apparatus as claimed in claim 1, wherein the phase detector determines whether the tracking error signal is normal by determining a phase error between the signals of the selected group.

3. The apparatus as claimed in claim 2, wherein the selection controller selects a next one of the first through third groups if the phase error of a current one of the first through groups deviates from a predetermined range.

4. The apparatus as claimed in claim 3, wherein the phase detector detects a phase difference between the signals of the current group by determining zero-crossing points of the signals, and then determining a phase difference between the zero-crossing points.

5. The apparatus as claimed in claim 1, wherein the selection controller selects a next one of the first through third groups if the phase detector determines that the tracking error signal determined from a current one of the first through groups is not normal.

6. The apparatus as claimed in claim 1, wherein the phase detector determines whether the tracking error signal is normal by determining whether the tracking error signal, which is a sinusoidal wave, varies within a range between peak-to-peak values.

7. The apparatus as claimed in claim 2, wherein the phase detector determines whether the tracking error signal is normal by determining whether the tracking error signal, which is a sinusoidal wave, varies within a range between peak-to-peak values.

8. The apparatus as claimed in claim 1, wherein the selection controller initially selects a first one of the first through third groups, the phase detector determines whether the tracking error signal determined in response to reception of the first one of the first through third groups is normal, the selection controller selects a second one of the first through third groups if the tracking error signal determined from the reception of the first one of the first through third groups is not normal, the phase detector determines whether the tracking error signal determined in response to the second one of the first through third groups is normal, and the selection controller selects a third one of the first through third groups if the tracking error signal determined from the reception of the second one of the first through third groups is not normal.

9. The apparatus as claimed in claim 2, wherein the selection controller initially controls selection of a first one of the first through third groups, the phase detector determines whether a first phase error between signals of a first one of the first through third groups is within a predetermined range, the selection controller controls selection of a second one of the first through third groups if the first phase error is not within the predetermined range, the phase detector determines whether a second phase error between signals of a second one of the first through third groups is within the predetermined range, and the selection controller controls selection of a third one of the first through third groups if the second phase error is not within the predetermined range.

10. The apparatus as claimed in claim 1, further comprising:
    first and second equalizers connected between the multiplexer and the phase detector, to respectively receive and equalize the signals from the first, second or third group output from the multiplexer, to generate equalized signals which are input to the phase detector.

11. The apparatus as claimed in claim 2, further comprising:
    first and second equalizers connected between the multiplexer and the phase detector, to respectively receive and equalize the signals from the first, second or third group output from the multiplexer, to generate equalized signals which are input to the phase detector.

12. The apparatus as claimed in claim 5, further comprising:
    first and second equalizers connected between the multiplexer and the phase detector, to respectively receive and equalize the signals from the first, second or third group output from the multiplexer, to generate equalized signals which are input to the phase detector.

13. The apparatus as claimed in claim 1, wherein the four elements are formed in a rectangular shape, and the elements which output the optical detection signals A and D are diagonal to each other in a track direction of the optical disk, and the elements which output the optical detection signals B and C are diagonal to each other in the track direction of the optical disk.

14. The apparatus as claimed in claim 2, wherein the four elements are formed in a rectangular shape, and the elements which output the optical detection signals A and D are diagonal to each other in a track direction of the optical disk, and the elements which output the optical detection signals B and C are diagonal to each other in the track direction of the optical disk.

15. An apparatus for generating a tracking error signal in response to a light beam reflected from an optical disk having an information recording surface with pits of varying pit depth, comprising:

an optical detector having a plurality of optical elements to receive the light beam reflected from the optical disk and to generate respective optical detection signals; and a tracking error signal generator to compensate for changes in the optical detection signals caused by the varying pit depth of the pits, and to generate the tracking error signal in response to the optical detection signals by selecting between first, second and third groups of the optical detection signals, the tracking error signal being based upon a phase difference between signals of a current selected group of the first through third groups while the phase difference is within a predetermined range, and then a group of the first through third groups next in order to the current selected group being selected in response to the phase difference being outside of the predetermined range.

16. The apparatus as claimed in claim 15, wherein:

the plurality of optical elements are first through fourth elements A, B, C, D, respectively, formed in a rectangular shape; and the first and fourth elements output optical detection signals A and D and are diagonal to each other in a track direction of the optical disk, and the second and third elements which output optical detection signals B and C are diagonal to each other in the track direction of the optical disk; and the tracking error signal generator comprises
a first adder to add the optical detection signals A and C to generate a first added signal,
a second adder to add the optical detection signals B and D to generate a second added signal,
a multiplexer to receive the first through fourth optical detection signals, and the first and second added signals, and to selectively output the first group comprising the first and second optical detection signals, the second group comprising the third and fourth optical detection signals, or the third group comprising the first and second added signals,
a phase detector to detect the phase difference between the signals of the current selected group, to generate the tracking error signal, and
a selection controller to control the selection of the multiplexer to the group of the first through third groups next in order to the current selected group if the phase difference is outside of the predetermined range.

17. The apparatus as claimed in claim 15, wherein:

the plurality of optical elements are first through fourth elements A, B, C, D, respectively, formed in a rectangular shape; and the first and fourth elements which output optical detection signals A and D are diagonal to each other in a track direction of the optical disk, and the second and third elements which output optical detection signals B and C are diagonal to each other in the track direction of the optical disk; and the tracking error signal generator selectively only uses the first group comprising the first and second optical detection signals, the second group comprising the third and fourth optical detection signals or the third group comprising sums of the first and second optical detection signals and the third and fourth optical detection signals to determine the tracking error signal, based upon whether the phase differences between signals of the first through third groups are within the predetermined range.

18. The apparatus as claimed in claim 17, wherein the tracking error signal generator initially selects the first group to determine whether the phase difference between the signals of the first group is within the predetermined range, selects the second group if not, and selects the third group if the phase difference between the signals of the second group is not within the predetermined range.

19. A method of generating a tracking error signal from first through fourth optical detection signals respectively output from first through fourth elements of an optical detector in response to a light beam reflected from an optical disk, comprising:

adding the first and third optical detection signals from the first and third elements which are adjacent to each other in a tracking direction of the optical disk to generate a first added signal, and the second and fourth optical detection signals from the second and fourth elements which are adjacent to each other to generate a second added signal;

determining the tracking error signal from a first group of the first and second optical detection signals, a second group of the third and fourth optical detection signals, or a third group of the first and second added signals; and determining whether the tracking error signal is normal, and if not, selecting another one of the first through third groups to determine the tracking error signal.

20. The method as claimed in claim 19, wherein the step of determining whether the tracking error signal is normal comprises:

determining a phase difference between the two signals used to determine the tracking error signal; and comparing the phase difference to a predetermined range.

21. The method as claimed in claim 20, wherein the step of determining the tracking error signal comprises:

receiving the first through fourth optical detection signals and the first and second added signals in a multiplexer; and selectively controlling transmission of the first, second or third group based upon whether the phase difference of the signals of a currently selected one of the first, second or third group are within the predetermined range.

22. The method as claimed in claim 19, wherein the step of determining the tracking error signal comprises:

receiving the first through fourth optical detection signals and the first and second added signals in a multiplexer; and selectively controlling transmission of the first, second or third group based upon whether the tracking error signal determined from a currently selected one of the first, second or third group is normal.

* * * * *